US009095979B2

(12) United States Patent
Motoyoshi (10) Patent No.: US 9,095,979 B2
(45) Date of Patent: *Aug. 4, 2015

(54) CONTROL DEVICE AND CONTROL METHOD FOR ROBOT AND THE ROBOT (71) Applicant: Seiko Epson Corporation, Tokyo (JP)

(72) Inventor: Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 44 days.

This patent is subject to a terminal disclaimer.

(21) Appl. No.: 13/953,120

(22) Filed: Jul. 29, 2013

(65) Prior Publication Data

US 2014/0039678 A1 Feb. 6, 2014

(30) Foreign Application Priority Data

Jul. 31, 2012 (JP) ................... 2012-169285

(51) Int. Cl.
B25J 9/16 (2006.01)
G05B 19/404 (2006.01)

(52) U.S. Cl.
CPC .............. B25J 9/1694 (2013.01); B25J 9/1641 (2013.01); G05B 19/404 (2013.01); G05B 2219/39195 (2013.01); G05B 2219/40549 (2013.01)

(58) Field of Classification Search
CPC .............. G05B 19/404; G05B 19/416; G05B 2219/41121; G05B 2219/41122; G05B 2219/42307; G05B 2219/41128
USPC ................................. 700/258, 254
See application file for complete search history.

(56) References Cited

U.S. PATENT DOCUMENTS

| 6,507,165 | B2 * | 1/2003 | Kato et al. | 318/611 |
| 6,508,122 | B1 | 1/2003 | McCall et al. | |
| 7,765,023 | B2 | 7/2010 | Oaki et al. | |
| 8,482,242 | B2 | 7/2013 | Nakasugi | |
| 2004/0162509 | A1 | 8/2004 | Sakurai et al. | |
| 2004/0179831 | A1 | 9/2004 | Tsuruta | |
| 2005/0246061 | A1 * | 11/2005 | Oaki et al. | 700/245 |
| 2007/0239315 | A1 | 10/2007 | Sato et al. | |
| 2009/0058346 | A1 | 3/2009 | Marushita et al. | |
| 2010/0148714 | A1 | 6/2010 | Okita et al. | |
| 2010/0318223 | A1 | 12/2010 | Motoyoshi et al. | |
| 2012/0035763 | A1 * | 2/2012 | Motoyoshi | 700/258 |
| 2012/0169265 | A1 * | 7/2012 | Usui et al. | 318/494 |
| 2013/0234642 | A1 * | 9/2013 | Igarashi et al. | 318/611 |

FOREIGN PATENT DOCUMENTS

| CN | 1344908 A | 4/2002 |
| CN | 1502067 A | 6/2004 |
| CN | 1984756 A | 6/2007 |
| JP | 01-173116 | 7/1989 |

(Continued)

Primary Examiner — Khoi Tran
Assistant Examiner — Ryan Rink
(74) Attorney, Agent, or Firm — Harness, Dickey & Pierce, P.L.C.

(57) ABSTRACT

A control method for suppressing vibration of a robot arm including a plurality of coupled links and driving units configured to drive the links includes calculating a first arm speed from at least one of acceleration and an angular velocity detected in a damping position for suppressing vibration, calculating a third arm speed according to the detected first arm speed and a second arm speed in the damping position calculated on the basis of a driving amount of the driving units, and subjecting the driving units to correction control on the basis of the calculated third arm speed.

9 Claims, 6 Drawing Sheets (56) References Cited

FOREIGN PATENT DOCUMENTS

| JP | 07-314360 | 12/1995 |
| JP | 10-006261 | 1/1998 |
| JP | 3442941 B2 | 9/2003 |
| JP | 2005-212054 A | 8/2005 |
| JP | 2005-242794 A | 9/2005 |
| JP | 2011-056622 A | 3/2011 |
| JP | 2011-136395 A | 7/2011 |

* cited by examiner

CONTROL DEVICE AND CONTROL METHOD FOR ROBOT AND THE ROBOT

BACKGROUND

1. Technical Field

The present invention relates to a control device and a control method for a robot and the robot.

2. Related Art

Industrial robots are experiencing heightened demands for increases in speed, functions, accuracy and power savings. In a multi-joint robot manufactured to meet these demands, a reduction in weight for realizing an increase in speed and power savings is generally contrary to an increase in rigidity for realizing an increase in accuracy. As such, both the reduction in weight and the increase in rigidity have been attained through a control technique. For example, JP-A-2011-136395 proposes a method of suppressing the vibration of a robot tip that occurs when the motion of a robot stops. Specifically, JP-A-2011-136395 proposes a method of providing an acceleration sensor at the tip of the robot and adding, on the basis of a detected torsional angular velocity and a detected torsion angle, a compensation amount for eliminating torsion to a control input of a motor which drives links to thereby control vibration. Consequently, an improvement in the position accuracy during stoppage and a reduction in standby time until suppression of the vibration have been attained.

However, the control method (i.e., the damping method) described in JP-A-2011-136395 has a problem in that the vibration that occurs during the motion of the robot cannot be suppressed. Specifically, since the method is based on the premise that the timing for acceleration detection is the time when the motion of the robot stops, for example, the vibration and motion strain that occurs during movement of a robot arm cannot be eliminated. Thus, when an operator causes the robot to perform a function such as painting or welding while moving the robot, the deterioration of the accuracy thereof due to the vibration cannot be suppressed.

SUMMARY

An advantage of some aspects of the invention is to solve at least a part of the problems described above, and the invention can be implemented as the following application examples or forms.

Application Example 1

This application example is directed to a control device for a robot including: a robot main body; an arm coupled to the robot main body and including a plurality of links; driving units configured to drive the plurality of links; and an angle sensor configured to detect a driving amount of the driving units, the control device including: an inertia sensor set in a damping position, where the vibration of the arm can be suppressed, and configured to detect at least one of acceleration and an angular velocity in the damping position; a first calculating unit configured to calculate a first arm speed in the damping position from at least one of the acceleration and the angular velocity in the damping position detected by the inertia sensor; a second calculating unit configured to calculate a driving speed from the driving amount of the driving units detected by the angle sensor and calculate a second arm speed in the damping position on the basis of the driving amount and the driving speed; a third calculating unit configured to calculate a third arm speed on the basis of the first arm speed and the second arm speed; a fourth calculating unit configured to calculate, on the basis of the third arm speed, a correction speed for each of the driving units that drive the links present between the robot main body and the damping position; and a control unit configured to control, on the basis of the driving amount, the driving speed, and the correction speed, the driving units that drive the links present between the robot main body and the damping position.

With the control device for the robot according to this application example, the third arm speed in the damping position is calculated on the basis of information concerning the first arm speed obtained from the inertia sensor and information concerning the second arm speed obtained from the angle sensor. The correction speed for each driving unit that drives the links present between the robot main body and the damping position is calculated on the basis of the calculated third arm speed. By controlling the respective driving units on the basis of the correction speed for each of the driving units, it is possible to suppress vibration that occurs in the damping position.

More specifically, for example, in the case of an ideal robot that is light in weight and high in rigidity and does not bend, have vibration due to the bending, and the like, an actual speed of an arm indicates an ideal arm speed. On the other hand, the first arm speed obtained from the inertia sensor is a speed detected according to an actual movement of the damping position where the inertia sensor is attached. That is, the first arm speed is a speed including a speed component such as vibration that occurs accompanying actual motion because of a bend and the like of the arm that does not have ideal rigidity. Therefore, it is possible to extract the speed component due to the bend and the vibration by evaluating a difference between the first arm speed and the second arm speed. It is possible to achieve suppression of the vibration by distributing the extracted speed component to the driving units, which drive the respective links, as the correction speed to generate torque for suppressing the bend and the vibration.

It is possible to suppress not only the vibration during the stoppage but also the vibration of the arm during driving (during motion) by performing the suppression of the vibration through the evaluation of the difference between the first arm speed and the second arm speed as desired. As a result, it is possible to more highly accurately control the arm position during the driving. Further, it is possible to suppress the vibration during the stoppage without waiting for the stopping motion of the arm. Therefore, it is possible to reduce a standby time until suppression of the vibration after the stop.

As explained above, with the control device for the robot according to this application example, it is possible to achieve further increases in accuracy, speed, and the like in the multi-joint robot.

Application Example 2

In the control device for the robot according to the application example, it is preferable that the control device further includes, in the third calculating unit, a filter for removing a low frequency component equal to or less than a predetermined frequency included in a waveform of the third arm speed.

In this application example, since the control device further includes the filter for removing the low frequency component of the third arm speed, it is possible to more appropriately extract a vibration component through the evaluation of the difference between the first arm speed and the second arm speed. Specifically, it is possible to reduce the influence of an incorrect correction for suppressing the original motion of the robot arm, an offset error of the inertia sensor, and the like by removing the low frequency component of the third arm speed.

Application Example 3

This application example is directed to a control method for a robot including: an arm including a plurality of coupled links; and driving units configured to drive the plurality of links, the control method including: detecting a first arm speed in a damping position for suppressing vibration of the arm; calculating a third arm speed on the basis of a difference between the detected first arm speed and a second arm speed calculated on the basis of a driving amount of the driving units, the second arm speed being a speed at which the damping position is driven; and subjecting the driving units to correction control on the basis of the calculated third arm speed.

Since the control method for the robot according to this application example includes calculating the third arm speed on the basis of the first arm speed and the second arm speed and subjecting the driving units to the correction control on the basis of the calculated third arm speed, it is possible to suppress vibration during the motion of the robot. As a result, it is possible to more highly accurately control the arm position during the driving (during the motion). Further, it is possible to suppress the vibration during the stoppage without waiting for stopping motion of the arm. Therefore, it is possible to reduce a standby time until suppression of the vibration after the stop. That is, with the control method for the robot according to this application example, it is possible to achieve further increases in accuracy, speed, and the like in the multi-joint robot.

Application Example 4

This application example is directed to a control method for a robot including: a robot main body; an arm coupled to the robot main body and including a plurality of links; driving units configured to drive the plurality of links; and an angle sensor configured to detect a driving amount of the driving units, the control method including: detecting, with an inertia sensor set in a damping position for suppressing the vibration of the arm, at least one of acceleration and an angular velocity in the damping position; detecting, with the angle sensor, a driving amount of the driving units that drive the links present between the damping position and the robot main body; calculating a first arm speed in the damping position from at least one of the acceleration and the angular velocity in the damping position detected by the inertia sensor; calculating a driving speed from the driving amount of the driving units detected by the angle sensor and calculating a second arm speed in the damping position on the basis of the driving amount and the driving speed; calculating a third arm speed in the damping position on the basis of the first arm speed and the second arm speed; calculating, on the basis of the third arm speed, a correction speed for each of the driving units that drive the links present between the robot main body and the damping position; and controlling, on the basis of the driving amount, the driving speed, and the correction speed, of the driving units that drive the links present between the robot main body and the damping position.

With the control method for the robot according to this application example, the third arm speed in the damping position is calculated on the basis of information concerning the first arm speed obtained from the inertia sensor and information concerning the second arm speed obtained from the angle sensor. The correction speed for each driving unit that drives the links present between the robot main body and the damping position is calculated on the basis of the calculated third arm speed. By controlling the respective driving units on the basis of the correction speed for each of the driving units, it is possible to suppress vibration that occurs in the damping position.

More specifically, for example, in the case of an ideal robot that is light in weight and high in rigidity and does not bend, have vibration due to the bending, and the like, an actual speed of an arm indicates an ideal arm driving speed. On the other hand, the first arm speed obtained from the inertia sensor is a speed detected according to an actual movement of the damping position where the inertia sensor is attached. That is, the first arm speed is a speed including a speed component such as vibration that occurs accompanying actual motion because of a bend and the like of the arm that does not have ideal rigidity. Therefore, it is possible to extract the speed component due to the vibration by evaluating a difference between the first arm speed and the second arm speed. It is possible to achieve suppression of the vibration by distributing the extracted speed component to the driving units, which drive the respective links, as the correction speed to generate torque for suppressing the vibration.

It is possible to suppress not only the vibration during the stoppage but also the vibration of the arm during driving (during motion) by performing the suppression of the vibration through the evaluation of the difference between the first arm speed and the second arm speed as desired. As a result, it is possible to more highly accurately control the arm position during the driving. Further, it is possible to suppress the vibration during the stoppage without waiting for stopping motion of the arm. Therefore, it is possible to reduce a standby time until suppression of the vibration after the stop.

As explained above, with the control method for the robot according to this application example, it is possible to achieve further increases in accuracy, speed, and the like in the multi-joint robot.

Application Example 5

In the control method for the robot according to the application example, it is preferable that the calculation of the third arm speed further includes removing a low frequency component equal to or less than a predetermined frequency included in a waveform of the calculated third arm speed.

In this application example, since the control device further includes removing the low frequency component of the third arm speed, it is possible to more appropriately extract a vibration component through the evaluation of the difference between the first arm speed and the second arm speed. Specifically, it is possible to reduce the influence of an incorrect correction for suppressing the original motion of the robot arm, an offset error of the inertia sensor, and the like by removing the low frequency component of the third arm speed.

Application Example 6

In the control method for the robot according to the application example, it is preferable that the calculation of the correction speed for each of the driving units that drive the links present between the robot main body and the damping position on the basis of the third arm speed is applied to the driving unit preselected among the driving units.

With the control method for the robot according to this application example, for example, when the driving unit that does not need to be controlled to suppress vibration is known in advance or when there is the driving unit that is not controlled intentionally, the respective kinds of processing are more simplified and processing speed is increased by excluding the driving unit from the target of the control. Therefore, it is possible to more efficiently perform the processing.

Application Example 7

In the control method for the robot according to the application example, it is preferable that the calculation of the correction speed for each of the driving units that drive the links present between the robot main body and the damping position involves weighting for each of the driving units set in advance.

With the control method for the robot according to this application example, it is possible to perform more effective suppression control for vibration according to specifications and characteristics of the robot or a load of work that the robot is performing (e.g., the weight of an object held by a robot hand) by distributing the magnitude of the correction speed for each of the driving units according to the weighting for each of the driving units set in advance. Specifically, for example, it is possible to more effectively perform suppression of vibration by setting larger damping torque of the driving units in a portion close to the robot main body. For example, when the object held by the robot hand changes and the weight changes in a series of motion of the robot, it is possible to more effectively perform the suppression of vibration.

Application Example 8

This application example is directed to a robot including: a robot main body; an arm coupled to the robot main body and including a plurality of links; driving units configured to drive the plurality of links; an angle sensor configured to detect a driving amount of the driving units; an inertia sensor set in a damping position, where the vibration of the arm can be suppressed, and configured to detect at least one of acceleration and an angular velocity in the damping position; a first calculating unit configured to calculate a first arm speed in the damping position from at least one of the acceleration and the angular velocity in the damping position detected by the inertia sensor; a second calculating unit configured to calculate a driving speed from the driving amount of the driving units detected by the angle sensor and calculate a second arm speed in the damping position on the basis of the driving amount and the driving speed; a third calculating unit configured to calculate a third arm speed on the basis of the first arm speed and the second arm speed; a fourth calculating unit configured to calculate, on the basis of the third arm speed, a correction speed for each of the driving units that drive the links present between the robot main body and the damping position; and a control unit configured to control, on the basis of the driving amount, the driving speed, and the correction speed, the driving units that drive the links present between the robot main body and the damping position.

According to this application example, by using, as the robot, the control device for the robot, it is possible to more effectively suppress vibration that occurs during the motion of the robot. As a result, it is possible to provide a robot in which the increase in accuracy, speed, and the like are further attained. For example, when an operator causes the robot to perform highly accurate work while moving the robot, it is possible to suppress deterioration in accuracy of the work due to vibration.

Application Example 9

In the robot according to the application example, it is preferable that the robot further includes, in the third calculating unit, a filter for removing a low frequency component equal to or less than a predetermined frequency included in a waveform of the third arm speed.

In this application example, since the control device further includes the filter for removing the low frequency component of the third arm speed, it is possible to more appropriately extract a vibration component through the evaluation of the difference between the first arm speed and the second arm speed. Specifically, it is possible to reduce the influence of an incorrect correction for suppressing the original motion of the robot arm, an offset error of the inertia sensor, and the like by removing the low frequency component of the third arm speed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the drawings. The embodiments explained below are examples of the invention and do not limit the invention. In the figures, the components are shown in scales that are different from actual scales to facilitate understanding of the explanation.

First Embodiment

First, a control device and a control method for a robot according to a first embodiment are explained.

Figure 1:
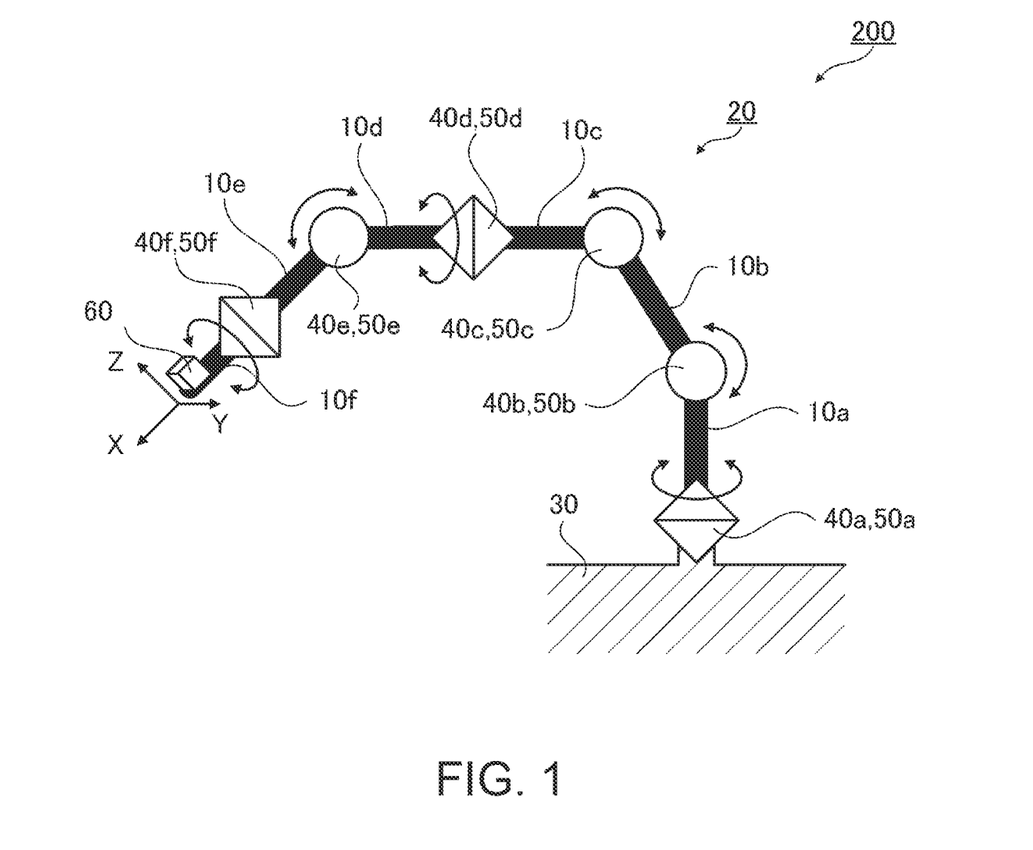
FIG. 1 is a schematic diagram showing a link model of a robot according to a first embodiment.

FIG. 1 is a schematic diagram showing a link model of a robot 200 mounted with the control device for the robot according to the first embodiment. In FIG. 1, the control device for the robot is not shown.

The robot 200 is a six-axis multi-joint robot. The robot 200 includes an arm 20 including six coupled links 10 (10a to 10f), a robot main body 30 including the arm 20, and six driving units 40 (40a to 40f) configured to respectively drive the links 10.

In the following explanation, an "arm" includes a "structure in which a plurality of links are coupled". Coupling sections functioning as joints for coupling the respective links include the driving units having a function of driving the respective links.

In the arm 20, the six links 10a to 10f are coupled in order via the driving units 40a to 40f. At a distal end portion of the link 10f forming one end of the arm 20, a hand tool, a welding gun, a spray gun, or the like (not shown in the figure) is attached as a hand unit.

The other end of the arm 20 is coupled to the robot main body 30 via the driving unit 40a.

The driving units 40a, 40d, and 40f include motors configured to rotate the shafts of the links 10a, 10d, and 10f coupled to the driving units 40a, 40d, and 40f.

The driving units 40b, 40c, and 40e include motors configured to pivot the links 10b, 10c, and 10e coupled to the driving units 40b, 40c, and 40e to change the coupling angles of the links 10b, 10c, and 10e.

The robot 200 having the configuration explained above has a cantilever structure in which one end of the arm 20 is supported by the robot main body 30. Therefore, a bend corresponding to the rigidity and a motion speed of the arm 20 provided as the structure, a weight load of the hand unit, and the like and vibration due to the bend occur in the arm 20. To attain improvement of motion position accuracy of the arm 20, an increase in speed of motion, and the like, the position accuracy can be improved and high-speed position control for motion can be performed by programming taking into account an amount of the bend and the vibration in advance. However, a load of the programming is large or a great difficulty in a motion analysis and the like is involved. Therefore, it is more convenient and desirable to perform control for suppressing a bend and vibration that occur during motion while detecting the bend and the vibration.

The control device for the robot according to this embodiment has this control function. The function is explained below.

Figure 2:
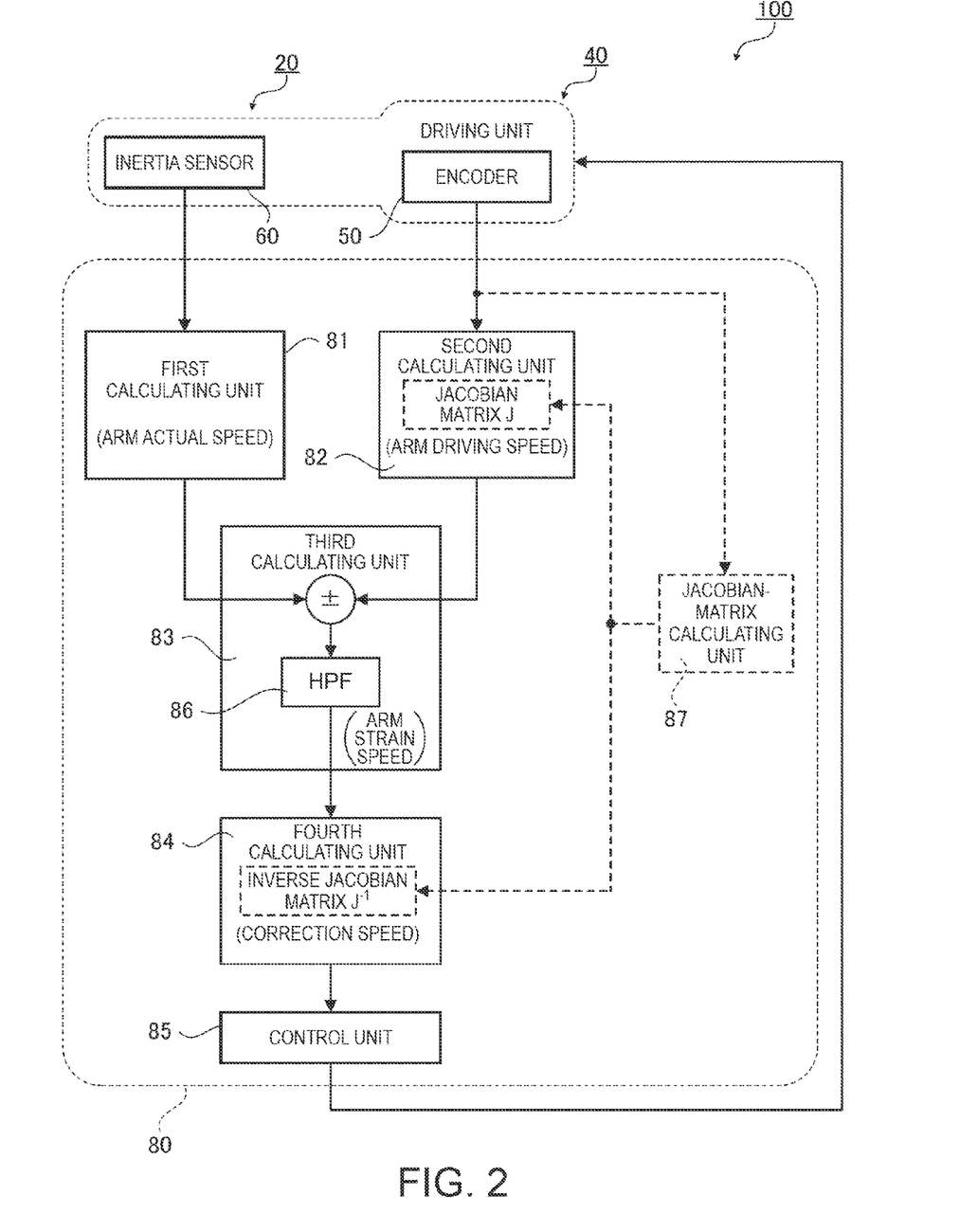
FIG. 2 is a functional block diagram of a control device for the robot according to the first embodiment.

FIG. 2 is a functional block diagram of a damping device 100 functioning as the control device for the robot according to the first embodiment.

The damping device 100 is the control device for the robot that suppresses a bend and vibration ("bend and vibration" is hereinafter referred to as "vibration") that occurs in the arm 20 in the robot 200 during motion or during a stop. The damping device 100 includes encoders 50 (50a to 50f) functioning as angle sensors, an inertia sensor 60, and a calculation control unit 80.

First, referring back to FIG. 1, the encoders 50 and the inertia sensor 60 are explained. The encoders 50 (50a to 50f) detect respective rotation angles $\theta_1$ to $\theta_6$ of the motors included in the driving units 40a to 40f, i.e., driving amounts of the driving units 40. The inertia sensor 60 is a six-axis sensor and detects accelerations and angular velocities in an attached position. That is, the inertia sensor 60 detects accelerations (X", y", z") in X, Y, and Z axis directions in FIG. 1 and angular velocities (Rx', Ry', Rz') around the X, Y, and Z axes.

In the damping device 100, the inertia sensor 60 is attached to a damping position, which is a target position for suppressing the vibration of the arm 20. In this example of the robot 200, the inertia sensor 60 is attached to the link 10f (i.e., a link at a distal end portion of the arm 20).

Referring back to FIG. 2, the calculation control unit 80 is explained.

The calculation control unit 80 includes first to fourth calculating units 81 to 84, a control unit 85, and a Jacobian-matrix calculating unit 87.

The first calculating unit 81 calculates a first arm speed in the damping position from the accelerations and the angular velocities in the damping position detected by the inertia sensor 60.

The second calculating unit 82 calculates a driving speed from the driving amounts of the driving units 40 detected by the encoders 50 and calculates an arm driving speed in the damping position on the basis of a Jacobian matrix J corresponding to the driving speed and the damping position. The Jacobian-matrix calculating unit 87 calculates the Jacobian matrix J on the basis of, for example, information concerning the driving amounts detected by the encoders 50.

The third calculating unit 83 calculates a third arm speed in the damping position on the basis of the first arm speed calculated by the first calculating unit 81 and the second arm speed calculated by the second calculating unit 82. The third calculating unit 83 includes a filter 86 and removes a low frequency component equal to or less than a predetermined frequency included in a waveform of the calculated third arm speed. In this embodiment, the predetermined frequency is set to 1 Hz to remove a low frequency component equal to or less than 1 Hz. The filter 86 is configured by an HPF (High Pass Filter).

The fourth calculating unit 84 calculates, on the basis of the third arm speed calculated by the third calculating unit 83, a correction speed of each of the driving units 40 that drive the links 10 present between the robot main body 30 and the damping position according to an inverse Jacobian matrix $J^{-1}$. The Jacobian-matrix calculating unit 87 calculates the inverse Jacobian matrix $J^{-1}$ on the basis of, for example, the information concerning the driving amounts detected by the encoders 50.

The control unit 85 controls, on the basis of the correction speed calculated by the fourth calculating unit 84, the driving units 40 that drive the links 10 present between the robot main body 30 and the damping position.

Figure 3:
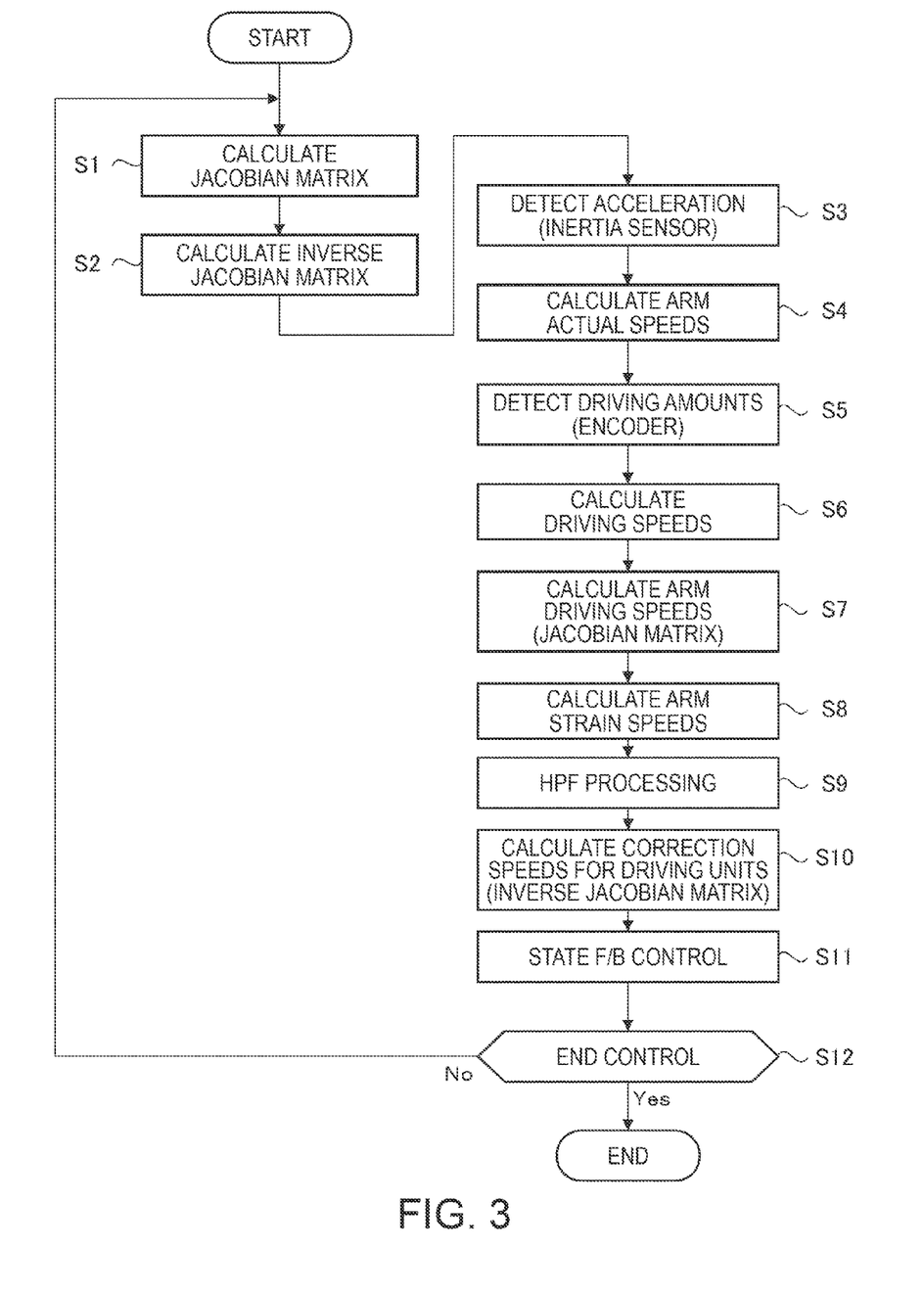
FIG. 3 is a flowchart for explaining a damping method adopted as a control method for the robot.

FIG. 3 is a flowchart for explaining a damping method by the damping device 100 adopted as a control method for a robot according to this embodiment.

The calculation control unit 80 and a damping method by the calculation control unit 80 are specifically explained concerning the link model of the robot 200 shown in FIG. 1 with reference to the flowchart of FIG. 3.

First, according to the operation of the robot 200, the calculation control unit 80 calculates the Jacobian matrix J corresponding to the damping position on the basis of the configuration specifications of the robot 200 (a coupling distance of the links, etc.), information concerning the damping position in the robot 200 to which the inertia sensor 60 is attached, the rotation angles $\theta_1$ to $\theta_6$ detected by the encoders 50 (50a to 50f), and the like (step S1).

Subsequently, the calculation control unit 80 calculates an inverse matrix of the Jacobian matrix J to calculate the inverse Jacobian matrix $J^{-1}$ (step S2).

The Jacobian matrix J and the inverse Jacobian matrix $J^{-1}$ satisfy a relational expression shown below.

$$\begin{bmatrix} x' \\ y' \\ z' \\ R'_x \\ R'_y \\ R'_z \end{bmatrix} = J \begin{bmatrix} \theta'_1 \\ \theta'_2 \\ \theta'_3 \\ \theta'_4 \\ \theta'_5 \\ \theta'_6 \end{bmatrix}$$

-continued $$J = \begin{bmatrix} \frac{\partial x}{\partial \theta_1} & \frac{\partial x}{\partial \theta_2} & \frac{\partial x}{\partial \theta_3} & \frac{\partial x}{\partial \theta_4} & \frac{\partial x}{\partial \theta_5} & \frac{\partial x}{\partial \theta_6} \\ \frac{\partial y}{\partial \theta_1} & \frac{\partial y}{\partial \theta_2} & \frac{\partial y}{\partial \theta_3} & \frac{\partial y}{\partial \theta_4} & \frac{\partial y}{\partial \theta_5} & \frac{\partial y}{\partial \theta_6} \\ \frac{\partial z}{\partial \theta_1} & \frac{\partial z}{\partial \theta_2} & \frac{\partial z}{\partial \theta_3} & \frac{\partial z}{\partial \theta_4} & \frac{\partial z}{\partial \theta_5} & \frac{\partial z}{\partial \theta_6} \\ \frac{\partial R_x}{\partial \theta_1} & \frac{\partial R_x}{\partial \theta_2} & \frac{\partial R_x}{\partial \theta_3} & \frac{\partial R_x}{\partial \theta_4} & \frac{\partial R_x}{\partial \theta_5} & \frac{\partial R_x}{\partial \theta_6} \\ \frac{\partial R_y}{\partial \theta_1} & \frac{\partial R_y}{\partial \theta_2} & \frac{\partial R_y}{\partial \theta_3} & \frac{\partial R_y}{\partial \theta_4} & \frac{\partial R_y}{\partial \theta_5} & \frac{\partial R_y}{\partial \theta_6} \\ \frac{\partial R_z}{\partial \theta_1} & \frac{\partial R_z}{\partial \theta_2} & \frac{\partial R_z}{\partial \theta_3} & \frac{\partial R_z}{\partial \theta_4} & \frac{\partial R_z}{\partial \theta_5} & \frac{\partial R_z}{\partial \theta_6} \end{bmatrix}$$

$$\begin{bmatrix} \theta'_1 \\ \theta'_2 \\ \theta'_3 \\ \theta'_4 \\ \theta'_5 \\ \theta'_6 \end{bmatrix} = J^{-1} \begin{bmatrix} x' \\ y' \\ z' \\ R'_x \\ R'_y \\ R'_z \end{bmatrix}$$

Subsequently, the calculation control unit 80 calculates, in the first calculating unit 81, first arm speeds ($x_1'$, $y_1'$, $z_1'$, $Rx_1'$, $Ry_1'$, $Rz_1'$) in the damping position from accelerations and angular velocities ($x_1''$, $y_1'$, $z_1''$, $Rx_1'$, $Ry_1'$, $Rz_1'$) in the damping position detected by the inertia sensor 60 (step S3) (step S4).

Subsequently, the calculation control unit 80 calculates, in the second calculating unit 82, driving speeds θ' ($\theta'_1$, $\theta'_2$, $\theta'_3$, $\theta'_4$, $\theta'_5$, $\theta'_6$) from the driving amounts (rotation angles $\theta_1$ to $\theta_6$) of the driving units 40a to 40f detected by the encoders 50 (step S5) (step S6) and calculates second arm speeds ($x_2'$, $y_2'$, $z_2'$, $Rx_2'$, $Ry_2'$, $Rz_2'$) in the damping position on the basis of the driving speeds and the Jacobian matrix J corresponding to the damping position (step S7).

Subsequently, the calculation control unit 80 calculates, in the third calculating unit 83, differences between the first arm speeds calculated by the first calculating unit 81 and the second arm speeds calculated by the second calculating unit 82 and calculates third arm speeds ($x_1'$, $-x_2'$, $y_1'$, $-y_2'$, $z_1'$, $-z_2'$, $Rx_1'$, $-Rx_2'$, $Ry_1'$, $-Ry_2'$, $Rz_1'$, $-Rz_2'$) (step S8). The calculation control unit 80 removes, with the filter 86 included in the third calculating unit 83, low frequency components equal to or less than a predetermined frequency included in waveforms of the calculated third arm speeds (step S9). Specifically, in this embodiment, low frequency components equal to or less than 1 Hz are removed by the HPF.

Subsequently, the calculation control unit 80 calculates, in the fourth calculating unit 84, correction speeds θ'r ($\theta'r_1$ to $\theta'r_6$) for each of the driving units 40 that drive the links 10 present between the robot main body 30 and the damping position according to the inverse Jacobian matrix $J^{-1}$ on the basis of the third arm speeds calculated by the third calculating unit 83 (step S10). The correction speeds θ'r ($\theta'r_1$ to $\theta'r_6$) satisfy a relational expression shown below.

$$\begin{bmatrix} \theta'_{r1} \\ \theta'_{r2} \\ \theta'_{r3} \\ \theta'_{r4} \\ \theta'_{r5} \\ \theta'_{r6} \end{bmatrix} = J^{-1} \begin{bmatrix} x'_1 - x'_2 \\ y'_1 - y'_2 \\ z'_1 - z'_2 \\ R'_{x1} - R'_{x2} \\ R'_{y1} - R'_{y2} \\ R'_{z1} - R'_{z2} \end{bmatrix}$$

Subsequently, the calculation control unit 80 applies, in the control unit 85, on the basis of the driving amounts (the rotation angles $\theta_1$ to $\theta_6$), the driving speeds θ', and the correction speeds θ'r, feedback control to the driving units 40 that drive the links 10 present between the robot main body 30 and the damping position (step S11). Specifically, the calculation control unit 80 controls the motors included in the respective driving units 40a to 40f to generate torque in a direction for cancelling the correction speeds θ'r ($\theta'r_1$ to $\theta'r_6$) distributed to the respective driving units 40a to 40f.

Subsequently, the calculation control unit 80 determines whether to end the control (step S12). When continuing the control of the robot, the calculation control unit 80 returns to step S1.

As explained above, with the control device and the control method for the robot according to this embodiment, it is possible to obtain effects explained below.

The third arm speeds in the damping position are calculated on the basis of information concerning the first arm speeds obtained from the inertia sensor 60 and information concerning the second arm speeds obtained from the encoders 50. The correction speeds for each of the driving units 40 that drive the links 10 present between the robot main body 30 and the damping position are calculated on the basis of the calculated third arm speeds. By controlling the respective driving units 40 on the basis of the correction speeds for each of the driving units 40, it is possible to suppress vibration that occurs in the damping position.

More specifically, the arm driving speeds in the damping position obtained from the encoders 50 are speeds calculated from driving amounts controlled to follow a command (e.g. a command programmed in advance) for controlling the plurality of driving units 40. Therefore, the arm driving speeds are speeds including extremely few speed components due to vibration or the like that occurs in the arm 20 accompanying motion. That is, in the case of an ideal robot that is light in weight and high in rigidity and does not bend, have vibration due to the bending, and the like, actual speeds of the arm 20 indicate ideal arm speeds.

On the other hand, the first arm speeds obtained from the inertia sensor 60 are speeds detected according to an actual movement of the damping position where the inertia sensor 60 is attached. That is, the first arm speeds are speeds including speed components such as vibration that occurs accompanying actual motion because of a bend and the like of the arm 20 that does not have ideal rigidity. Therefore, it is possible to extract the speed components due to the vibration by evaluating differences between the first arm speeds and the second arm speeds. It is possible to achieve suppression of the vibration by distributing the extracted speed components of the vibration to the driving units 40, which drive the respective links 10, as the correction speeds to generate torque for suppressing the vibration.

It is possible to suppress not only the vibration during the stoppage but also the vibration of the arm 20 during driving (during motion) by performing the suppression of the vibration through the evaluation of the differences between the first arm speeds and the second arm speeds as desired. As a result, it is possible to more highly accurately control the arm position during the driving. Further, it is possible to suppress the vibration during the stoppage without waiting for stopping motion of the arm 20. Therefore, it is possible to reduce a standby time until suppression of the vibration after the stop.

Since the damping device 100 further includes the filter 86 for removing the low frequency components equal to or less than the predetermined frequency included in the waveforms of the third arm speeds, it is possible to more appropriately extract vibration components through the evaluation of the differences between the first arm speeds and the second arm speeds. Specifically, it is possible to reduce the influence of an incorrect correction for suppressing the original motion of the arm 20, an offset error of the inertia sensor 60, and the like by removing the low frequency components of the third arm speeds.

As explained above, with the control device and the control method for the robot according to this embodiment, it is possible to achieve further increases in accuracy, speed, and the like in the multi-joint robot.

In the above explanation, the third calculating unit 83 includes the filter 86 to remove the low frequency components equal to or less than 1 Hz as the low frequency components equal to or less than the predetermined frequency included in the waveforms of the calculated third arm speeds. However, the predetermined frequency does not always need to be 1 Hz. It is desirable to determine the predetermined frequency as appropriate according to a damping state of the damping position. The third calculating unit 83 does not always need to include the filter 86. For example, the filter 86 can be omitted when there are no low frequency components to be removed in the calculated third arm speeds or when the low frequency components can be neglected.

In the above explanation, calculation control unit 80 calculates the Jacobian matrix J and the inverse Jacobian matrix $J^{-1}$ in the Jacobian-matrix calculating unit 87 on the basis of, for example, the information concerning the driving amounts detected by the encoders 50. However, the calculation control unit 80 does not always need to calculate the Jacobian matrix J and the inverse Jacobian matrix $J^{-1}$ during the operation of the robot 200. For example, it is also possible to adopt a method of setting timings for damping in advance, preparing in advance, as a table, Jacobian matrixes J and inverse Jacobian matrixes $J^{-1}$ adjusted to the timings, and selecting, every time, the Jacobian matrix J and the inverse Jacobian matrix $J^{-1}$ corresponding to damping timing. In this case, it is unnecessary to provide the Jacobian-matrix calculating unit 87 in the calculation control unit 80.

Second Embodiment

A control device and a control method for a robot according to a second embodiment are explained. In the explanation, components that are the same as the components in the first embodiment are denoted by the same reference numerals and signs and a redundant explanation of the components is omitted.

Figure 4:
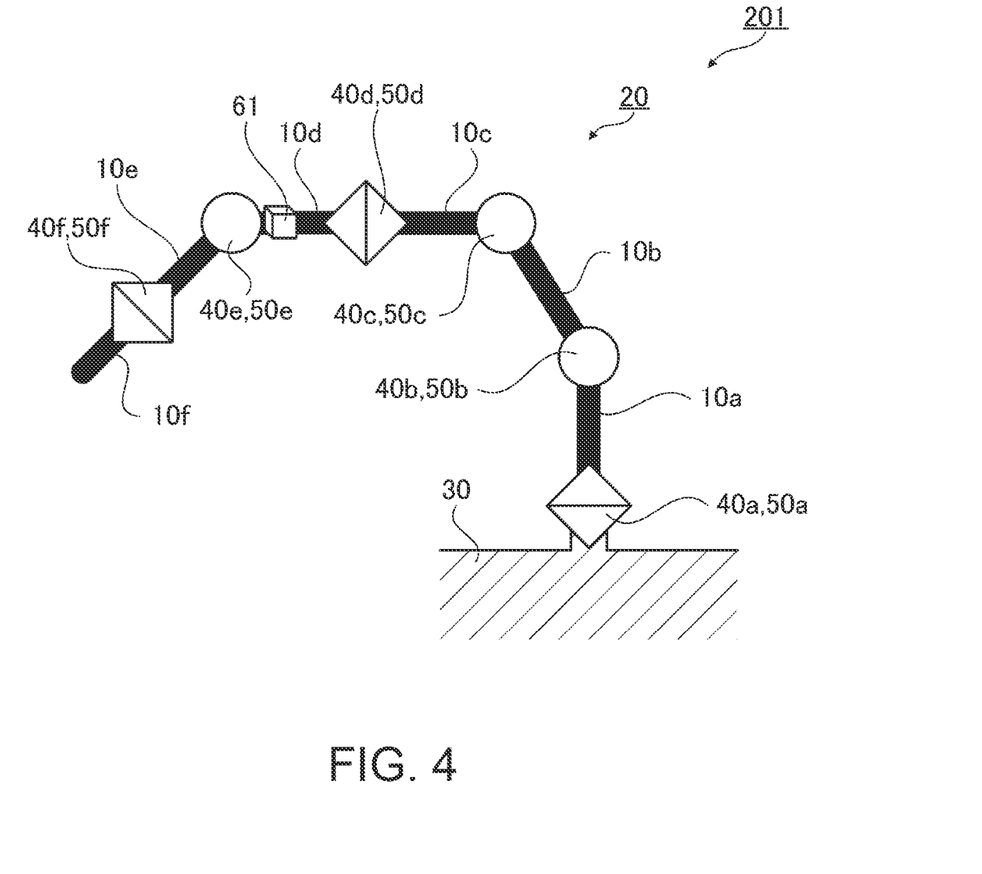
FIG. 4 is a schematic diagram showing a link model of a robot according to a second embodiment.

FIG. 4 is a schematic diagram showing a link model of a robot 201 mounted with the control device for the robot according to the second embodiment.

The robot 201 is a six-axis multi-joint robot same as the robot 200 mounted with a damping device 101 (not shown in the figure).

The damping device 101 is the same as the damping device 100 except that a gyro sensor (hereinafter, inertia sensor 61) that detects angular velocities (Rx', Ry', Rz') of three axes is used as the inertia sensor. In this embodiment, the inertia sensor 61 is attached to the link 10d. That is, whereas the inertia sensor 60 is attached to the link 10f to suppress vibration in the distal end portion of the arm 20 in the first embodiment, in this embodiment, the inertia sensor is attached to the fourth link 10d and a position substantially in the middle of the arm 20 is set as a damping position. Whereas the inertia sensor 60 is the six-axis acceleration and angular velocity sensor in the first embodiment, in this embodiment, the gyro sensor that detects the angular velocities (Rx', Ry', Rz') of the three axes is used. Otherwise, the second embodiment is the same as the first embodiment.

Feedback control for suppressing vibration in this embodiment is applied to the driving units present on the robot main body 30 from the damping position where the inertia sensor 61 is attached. That is, on the basis of angular velocity information of the three axes, the control is applied to the four driving units 40a to 40d having one more degrees of freedom. In this way, in the case of the control with redundancy, the control is distributed according to a weighted pseudo-inverse matrix.

A Jacobian matrix $J_1$ and a weighted pseudo-inverse matrix $J_1^{\#}$ corresponding to this embodiment are shown below.

$$\begin{bmatrix} R'_x \\ R'_y \\ R'_z \end{bmatrix} = J_1 \begin{bmatrix} \theta'_1 \\ \theta'_2 \\ \theta'_3 \\ \theta'_4 \end{bmatrix}$$

$$J_1 = \begin{bmatrix} \frac{\partial R_x}{\partial \theta_1} & \frac{\partial R_x}{\partial \theta_2} & \frac{\partial R_x}{\partial \theta_3} & \frac{\partial R_x}{\partial \theta_4} \\ \frac{\partial R_y}{\partial \theta_1} & \frac{\partial R_y}{\partial \theta_2} & \frac{\partial R_y}{\partial \theta_3} & \frac{\partial R_y}{\partial \theta_4} \\ \frac{\partial R_z}{\partial \theta_1} & \frac{\partial R_z}{\partial \theta_2} & \frac{\partial R_z}{\partial \theta_3} & \frac{\partial R_z}{\partial \theta_4} \end{bmatrix}$$

$$\begin{bmatrix} \theta'_{r1} \\ \theta'_{r2} \\ \theta'_{r3} \\ \theta'_{r4} \end{bmatrix} = J_1^{\#} \begin{bmatrix} R'_x \\ R'_y \\ R'_z \end{bmatrix}$$

In the above formula, the weighted pseudo-inverse matrix $J_1^{\#}$ is given by the following relational expression:

$$J_1^{\#} = W^{-1} J_1^T (J_1^T W^{-1} J_1^T)^{-1}$$

$J_1^{\#}$ is a matrix for minimizing a weighted sum of squares of the correction speeds θ'r (θ'$r_1$ to θ'$r_4$) distributed to the respective driving units 40a to 40d calculated by the formula. That is, concerning a degree of freedom, movement for suppressing vibration is set to a minimum value.

W represents a 4×4 weighing matrix. That is, values of the correction speeds θ'r distributed to the respective driving units 40a to 40d are weighted.

The damping device 101 and the damping method are the same as the damping device 100 and the damping method according to the first embodiment except that the weighted pseudo-inverse matrix $J_1^{\#}$ is used instead of the inverse Jacobian matrix $J^{-1}$.

As explained in this embodiment, even in the robots having the different specifications, it is possible to perform suppression of vibration in the same manner by changing an attaching position of the inertia sensor according to the position of a target to be damped.

Further, by distributing the magnitude of the correction speed for each of the driving units 40 is distributed according to weighting for each of the driving units 40 set in advance, it is possible to perform more effective suppression control for vibration according to the specifications and the characteristics of the robot 201 or a load of work that the robot 201 is performing (e.g., the weight of an object held by a robot hand). Specifically, for example, it is possible to more effectively perform suppression of vibration by setting larger damping torque of the driving units 40 in a portion close to the robot main body 30. For example, when the object held by the robot hand changes and the weight changes in a series of motion of the robot 201, it is possible to more effectively perform the suppression of vibration.

Third Embodiment

A control device and a control method for a robot according to a third embodiment are explained. In the explanation, components that are the same as the components in the embodiments explained above are denoted by the same reference numerals and signs and a redundant explanation of the components is omitted.

Figure 5:
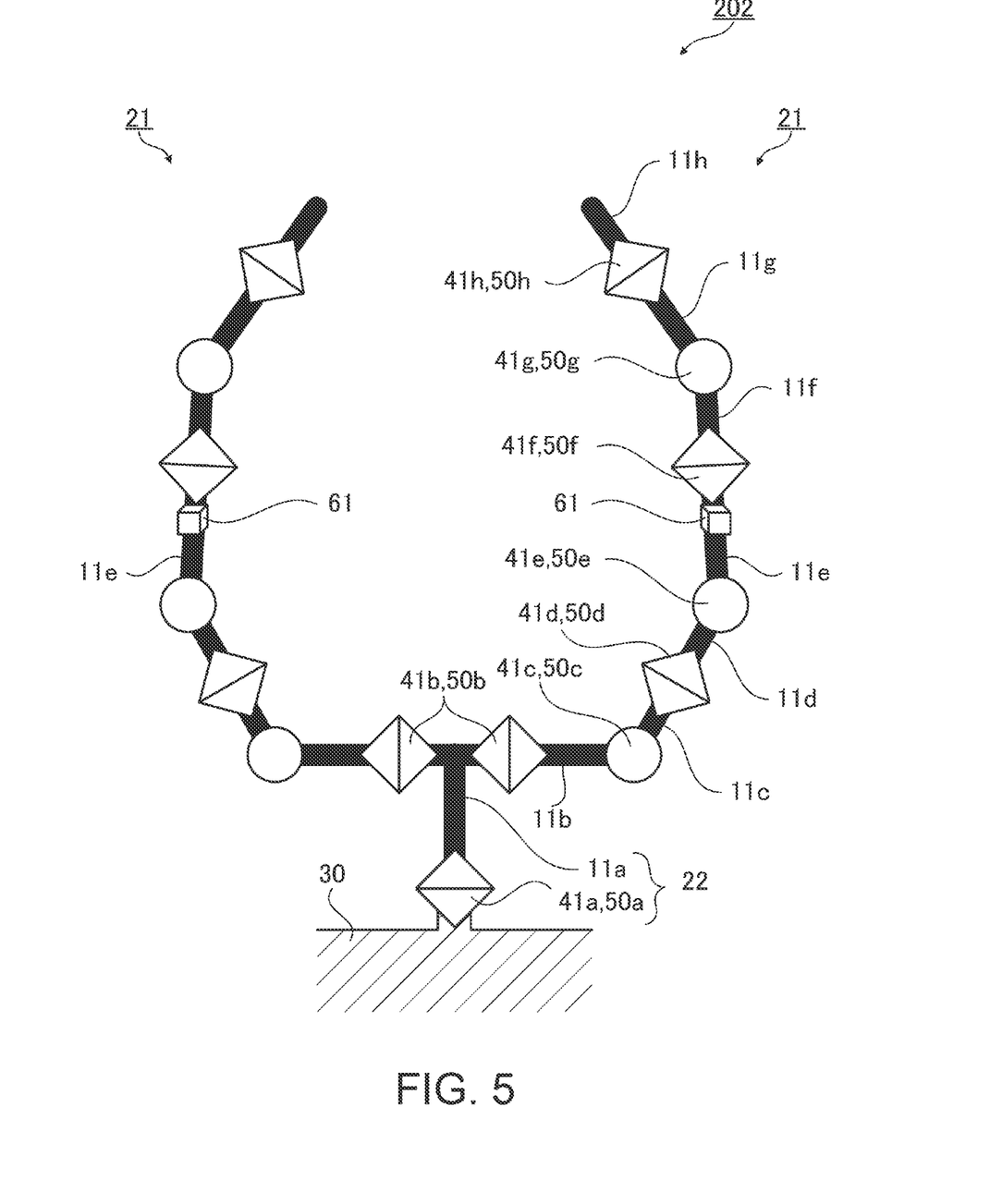
FIG. 5 is a schematic diagram showing a link model of a robot according to a third embodiment.

FIG. 5 is a schematic diagram showing a link model of a robot 202 mounted with the control device of the robot according to the third embodiment.

The robot 202 is a double-arm multi-joint robot mounted with a damping device 102 (not shown in the figure). The robot 202 includes two arms 21 forming seven-axis double arms, a revolving arm 22, the robot main body 30, and the damping device 102.

In the arm 21, the seven links 11b to 11h are coupled in order via driving units 41b to 41h. At a distal end portion of the link 11h forming one end of the arm 21, a hand tool, a welding gun, a spray gun, or the like (not shown in the figure) is attached as a hand unit.

The revolving arm 22 includes a link 11a and a driving unit 41a. One end of the link 11a is coupled to the robot main body 30 via the driving unit 41a. The other end supports, via the two driving units 41b, the two arms 21 coupled to the respective driving units 41b. That is, the other end of the arm 21 is coupled to the revolving arm 22 via the driving unit 41b.

The driving units 41a, 41b, 41d, 41f, and 41h include motors configured to rotate the shafts of the links 11a, 11b, 11d, 11f, and 11h coupled to the driving units 41a, 41b, 41d, 41f, and 41h.

The driving units 41c, 41e, and 41g include motors configured to pivot the links 11c, 11e, and 11g coupled to the driving units 41c, 41e, and 41g to change the coupling angles of the links 11c, 11e, and 11g.

The driving units 41a to 41h respectively include encoders 50a to 50h configured to detect driving amounts of the driving units 41a to 41h (rotation angles of the motors).

The encoders 50 (50a to 50h) detect respective rotation angles $\theta_1$ to $\theta_8$ of the motors included in the driving units 41a to 41h.

Inertia sensors 61 are attached to the respective links 11e of the arms 21.

Feedback control for suppressing vibration in this embodiment is independently applied to each of the arms 21. Therefore, the damping device 102 is configured such that two damping devices 101 are processed in parallel.

In the damping device 102, instead of such a configuration (including the two damping devices 101 to process the two damping devices 101 in parallel), a method of time-sharing one damping device 101 for the respective arms 21 may be adopted. That is, the damping device 102 may be configured to independently apply processing by one damping device 101 to the two arms 21 while switching the processing.

The state feedback control for suppressing vibration in this embodiment is not applied to the revolving arm 22 common to the respective arms 21. That is, the control is applied to the four driving units 41b to 41e on the basis of angular velocity information of three axes detected by the inertia sensor 61 included in each of the arms 21.

A Jacobian matrix $J_2$ and a weighted pseudo-inverse matrix $J_3^{\#}$ corresponding to this embodiment are shown below.

$$\begin{bmatrix} R'_x \\ R'_y \\ R'_z \end{bmatrix} = J_2 \begin{bmatrix} \theta'_1 \\ \theta'_2 \\ \theta'_3 \\ \theta'_4 \end{bmatrix}$$

$$J_2 = \begin{bmatrix} \frac{\partial R_x}{\partial \theta_1} & \frac{\partial R_x}{\partial \theta_2} & \frac{\partial R_x}{\partial \theta_3} & \frac{\partial R_x}{\partial \theta_4} & \frac{\partial R_x}{\partial \theta_5} \\ \frac{\partial R_y}{\partial \theta_1} & \frac{\partial R_y}{\partial \theta_2} & \frac{\partial R_y}{\partial \theta_3} & \frac{\partial R_y}{\partial \theta_4} & \frac{\partial R_y}{\partial \theta_5} \\ \frac{\partial R_z}{\partial \theta_1} & \frac{\partial R_z}{\partial \theta_2} & \frac{\partial R_z}{\partial \theta_3} & \frac{\partial R_z}{\partial \theta_4} & \frac{\partial R_z}{\partial \theta_5} \end{bmatrix}$$

$$J_3 = \begin{bmatrix} \frac{\partial R_x}{\partial \theta_2} & \frac{\partial R_x}{\partial \theta_3} & \frac{\partial R_x}{\partial \theta_4} & \frac{\partial R_x}{\partial \theta_5} \\ \frac{\partial R_y}{\partial \theta_2} & \frac{\partial R_y}{\partial \theta_3} & \frac{\partial R_y}{\partial \theta_4} & \frac{\partial R_y}{\partial \theta_5} \\ \frac{\partial R_z}{\partial \theta_2} & \frac{\partial R_z}{\partial \theta_3} & \frac{\partial R_z}{\partial \theta_4} & \frac{\partial R_z}{\partial \theta_5} \end{bmatrix}$$

$$\begin{bmatrix} \theta'_{r2} \\ \theta'_{r3} \\ \theta'_{r4} \\ \theta'_{r5} \end{bmatrix} = J_3^{\#} \begin{bmatrix} R'_x \\ R'_y \\ R'_z \end{bmatrix}$$

In the above formula, the Jacobian matrix $J_2$ is a matrix reflecting five axes ($\theta_1$ to $\theta_5$) of the driving units 41a to 41e. Therefore, the Jacobian matrix $J_2$ is given by a 3×5 matrix. On the other hand, the driving units to be controlled are four axes ($\theta_2$ to $\theta_5$) of the driving units 41b to 41e. Therefore, the weighted pseudo-inverse matrix $J_3^{\#}$ is calculated by the following relational expression using a 3×5 Jacobian matrix $J_3$ applied to the four axes ($\theta_2$ to $\theta_5$):

$$J_3^{\#} = W^{-1} J_2^T (J_2^T W^{-1} J_2^T)^{-1}$$

$J_3^{\#}$ is a matrix for minimizing a weighted sum of squares of the correction speeds $\theta'r$ ($\theta'r_2$ to $\theta'r_5$) distributed to the respective driving units 41b to 41e calculated by the formula. That is, as in the second embodiment, concerning a degree of freedom, movement for suppressing vibration is set to a minimum value.

As in this embodiment, for example, when the driving unit that does not need to be controlled to suppress vibration is known in advance or when there is the driving unit that is not controlled intentionally, the respective kinds of processing are more simplified and processing speed is increased by excluding the driving unit from the target of the control. Therefore, it is possible to more efficiently perform the processing.

Fourth Embodiment

A robot according to a fourth embodiment, which is a more specific form of the robot in the embodiments explained above, is explained. In the explanation, components that are the same as the components in the embodiments explained above are denoted by the same reference numerals and signs and a redundant explanation of the components is omitted.

Figure 6:
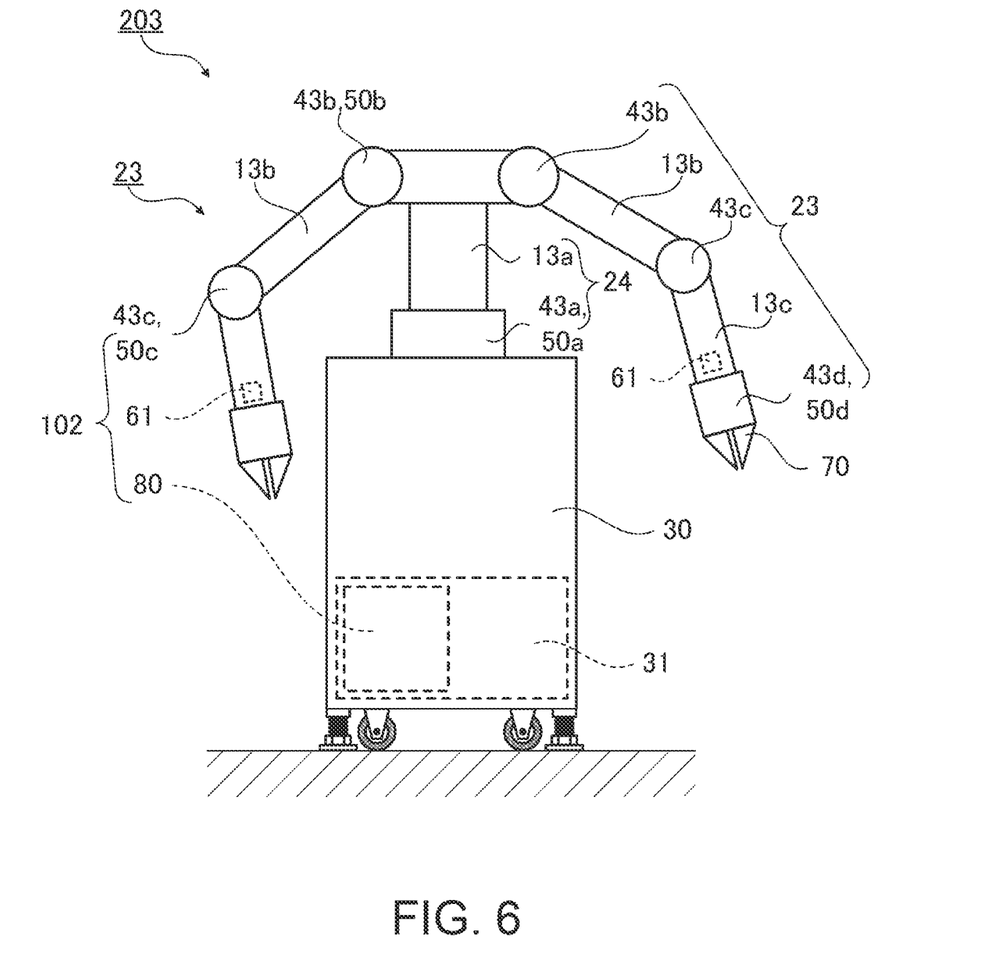
FIG. 6 is a schematic diagram of a robot according to a fourth embodiment.

FIG. 6 is a schematic diagram of a robot 203 according to the fourth embodiment.

The robot 203 is a double-arm multi-joint robot mounted with the damping device 102. The robot 203 includes two arms 23, a revolving arm 24, hands 70, the robot main body 30, and the damping device 102.

In the arm 23, a link 13b and a link 13c are coupled via a driving unit 43c. The hand 70 is provided at one end of the arm 23 via a driving unit 43d. The hand 70 has a function of gripping a predetermined object.

The revolving arm 24 includes a link 13a and a driving unit 43a. One end of the link 13a is coupled to the robot main body 30 via the driving unit 43a. The other end supports, via two driving units 43b, the two arms 23 coupled to the respective driving units 43b. That is, the other end of the arm 23 is coupled to the revolving arm 24 via the driving unit 43b.

The driving units 43b and 43c include motors configured to pivot the links 13b and 13c coupled to the driving units 43b and 43c to change the coupling angles of the links 13b and 13c.

The driving units 43a and 43d include motors configured to rotate the shafts of the link 13a and the hand 70 respectively coupled to the driving units 43a and 43d.

The respective driving units 43a to 43d include encoders 50a to 50d configured to detect driving amounts of the driving units 43a to 43d (rotation angles of the motors).

The inertia sensors 61 are attached to the respective links 13c of the arms 23.

The robot main body 30 supports the revolving arm 24 and supports the two arms 23 via the revolving arms 24. The robot main body 30 is set on the floor or the like. A robot controller 31 including the damping device 102 is provided on the inside of the robot main body 30. The robot controller 31 includes a control device such as the damping device 102 and performs control of the entire robot 203.

In the double-arm multi-joint robot having the configuration explained above, since the damping device 102 is mounted, as in the control method for the robot explained above, it is possible to suppress vibration that occurs in the arm 23 in motion. As a result, it is possible to provide the robot with a function of the multi-joint robot further improved to be capable of flexibly performing highly accurate and high-speed motion. For example, when a spray gun or the like is attached to the hand 70 to paint a painting target, if painting unevenness due to vibration in the arm 23 tends to occur, it is possible to reduce the painting unevenness by suppressing the vibration.

While various embodiments of the invention have been explained above, the invention is not limited thereto and various modifications can be made within the scope of the appended claims.

The entire disclosure of Japanese Patent Application No. 2012-169285 filed Jul. 31, 2012 is expressly incorporated by reference herein.

What is claimed is:

1. A control device for a robot including: a robot main body; an arm coupled to the robot main body and including a plurality of links; driving units configured to drive the plurality of links; and an angle sensor configured to detect a driving amount of the driving units, the control device comprising:

an inertia sensor set in a damping position corresponding to a target location at which vibration of the arm is to be suppressed, and configured to detect at least one of an acceleration and an angular velocity in the damping position;

a first calculating unit configured to calculate a first arm speed in the damping position from at least one of the acceleration and the angular velocity in the damping position detected by the inertia sensor;

a second calculating unit configured to calculate a driving speed from the driving amount of the driving units detected by the angle sensor and calculate a second arm speed in the damping position based on the driving amount and the driving speed;

a third calculating unit configured to calculate a third arm speed based on the first arm speed and the second arm speed;

a fourth calculating unit configured to calculate, based on the third arm speed, a correction speed for each of the driving units that drive the links present between the robot main body and the damping position; and a control unit configured to control, based on the driving amount, the driving speed, and the correction speed, the driving units that drive the links present between the robot main body and the damping position.

2. The control device for the robot according to claim 1, wherein the third calculating unit further comprises a filter for removing a low frequency component equal to or less than a predetermined frequency included in a waveform of the third arm speed.

3. A control method for a robot including: an arm including a plurality of coupled links; and driving units configured to drive the plurality of links, the control method including:

detecting a first arm speed in a damping position corresponding to a target location at which vibration of the arm is to be suppressed;

calculating a third arm speed based on a difference between the detected first arm speed and a second arm speed calculated based on a driving amount of the driving units, the second arm speed being a speed at which the damping position is driven; and subjecting the driving units to correction control based on the calculated third arm speed.

4. A control method for a robot including: a robot main body; an arm coupled to the robot main body and including a plurality of links; driving units configured to drive the plurality of links; and an angle sensor configured to detect a driving amount of the driving units, the control method comprising:

detecting, with an inertia sensor set in a damping position corresponding to a target location at which vibration of the arm is to be suppressed, at least one of an acceleration and an angular velocity in the damping position;

detecting, with the angle sensor, a driving amount of the driving units that drive the links present between the damping position and the robot main body;

calculating a first arm speed in the damping position from at least one of the acceleration and the angular velocity in the damping position detected by the inertia sensor;

calculating a driving speed from the driving amount of the driving units detected by the angle sensor and calculating a second arm speed in the damping position based on the driving amount and the driving speed;

calculating a third arm speed in the damping position based on the first arm speed and the second arm speed;

calculating, based on the third arm speed, a correction speed for each of the driving units that drive the links present between the robot main body and the damping position; and controlling, based on the driving amount, the driving speed, and the correction speed, the driving units that drive the links present between the robot main body and the damping position.

5. The control method for the robot according to claim 4, wherein the calculating of the third arm speed further includes removing a low frequency component equal to or less than a predetermined frequency included in a waveform of the calculated third arm speed.

6. The control method for the robot according to claim 4, wherein the calculating of the correction speed for each of the driving units that drive the links present between the robot main body and the damping position based on the third arm speed is applied to the driving unit preselected among the driving units.

7. The control method for the robot according to claim 4, wherein the calculating of the correction speed for each of the driving units that drive the links present between the robot main body and the damping position based on the third arm speed includes pre-weighting each of the driving units.

8. A robot comprising:
a robot main body;
an arm coupled to the robot main body and including a plurality of links;
driving units configured to drive the plurality of links;
an angle sensor configured to detect a driving amount of the driving units;
an inertia sensor set in a damping position corresponding to a target location at which vibration of the arm is to be suppressed, and configured to detect at least one of an acceleration and an angular velocity in the damping position;
a first calculating unit configured to calculate a first arm speed in the damping position from at least one of the acceleration and the angular velocity in the damping position detected by the inertia sensor;
a second calculating unit configured to calculate a driving speed from the driving amount of the driving units detected by the angle sensor and calculate a second arm speed in the damping position based on the driving amount and the driving speed;
a third calculating unit configured to calculate a third arm speed based on the first arm speed and the second arm speed;
a fourth calculating unit configured to calculate, based on the third arm speed, a correction speed for each of the driving units that drive the links present between the robot main body and the damping position; and
a control unit configured to control, based on the driving amount, the driving speed, and the correction speed, the driving units that drive the links present between the robot main body and the damping position.

9. The robot according to claim 8, wherein the third calculating unit further comprises a filter for removing a low frequency component equal to or less than a predetermined frequency included in a waveform of the third arm speed.

* * * * *